A. TINO AND A. H. ROTH.
ANTITHEFT DEVICE FOR AUTOMOBILES.
APPLICATION FILED AUG. 13, 1921.
1,435,431.
Patented Nov. 14, 1922.
2 SHEETS—SHEET 1.
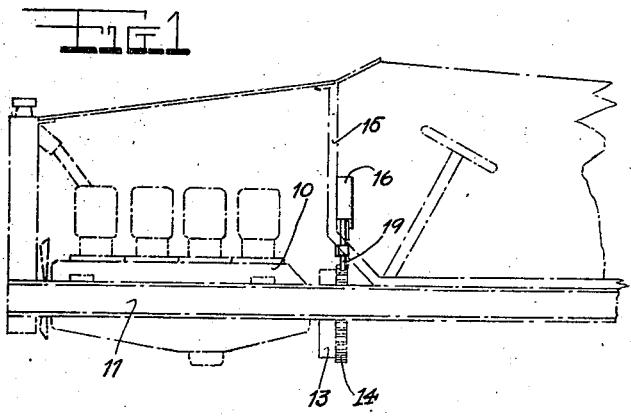
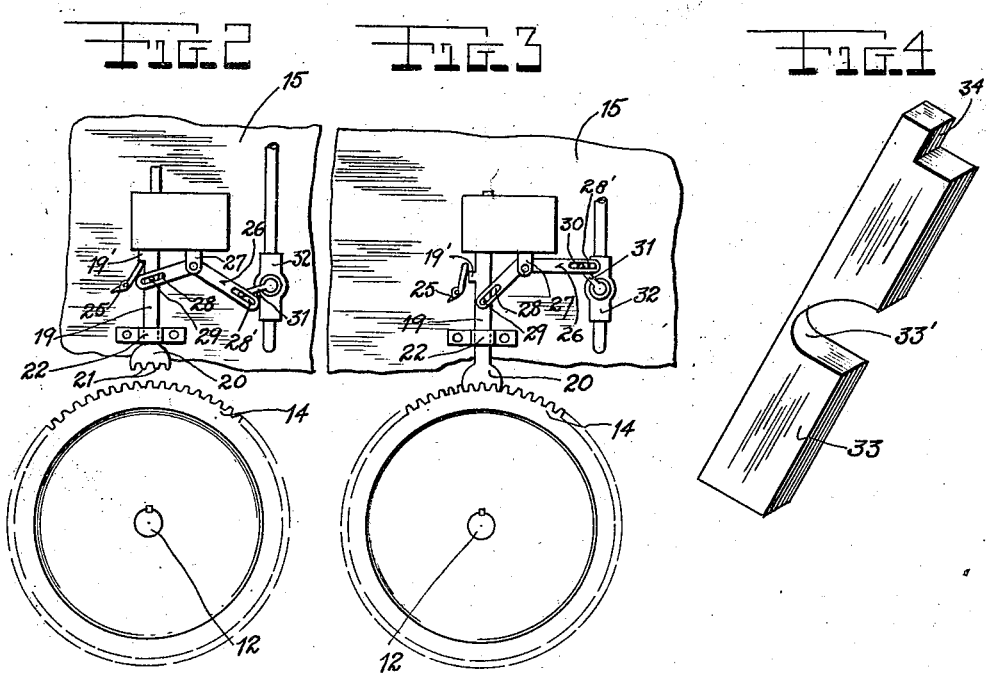
INVENTORS
Antonio Tino and
August H. Roth
BY
ATTORNEY

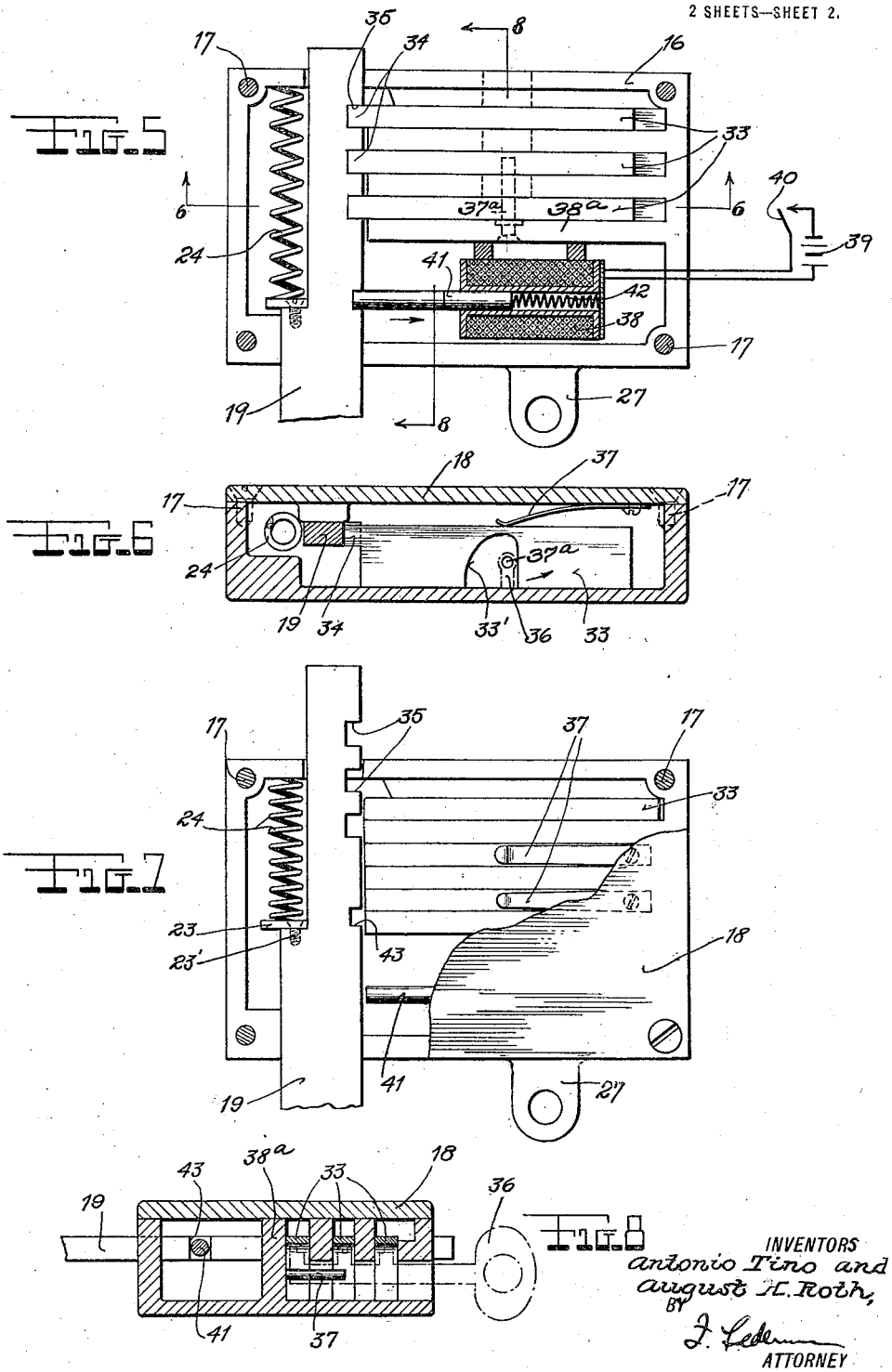

Patented Nov. 14, 1922.

1,435,431

UNITED STATES PATENT OFFICE.

ANTONIO TINO AND AUGUST H. ROTH, OF NEW YORK, N. Y.

ANTITHEFT DEVICE FOR AUTOMOBILES.

Application filed August 13, 1921. Serial No. 491,978.

*To all whom it may concern:*

Be it known that we, ANTONIO TINO and AUGUST H. ROTH, citizens of Italy and Jugo-Slovakia, respectively, residing at New York, in the county of New York and State of New York, have invented certain new and useful Improvements in Antitheft Devices for Automobiles, of which the following is a specification.

The invention relates to automobile locks and has particular reference to a type of lock which can be readily attached to the dash-board of any of the present day automobiles and which can be easily operated by means of a key.

Another object is the provision of a mechanism associated with the lock and operated by the locking plunger, which will simultaneously shut off the fuel supply.

Still another object is the provision of a lock having an auxiliary locking means which is both electrically and independently operable, so that locking means will be found effective against a person who has the key, but is not familiar with the device.

Still another object is the provision of a device which will lock the crank shaft of an automobile engine, thereby rendering the machine inoperable.

These and other objects will become apparent in the description to follow in which characters of reference refer to the like-named parts in the drawings.

Referring briefly to the drawings, Fig. 1 represents a schematic longitudinal section of the body of an automobile, and shows the device attached to the dash-board and the load equalizer wheel in the locked position.

Figure 2 is a front elevational view of the device as it is mounted on the dash-board and shows the load equalizer wheel free to be rotated and the fuel supply valve open.

Figure 3 is an identical view but shows the load equalizer wheel locked and the fuel supply valve closed.

Figure 4 is a perspective view of one of the key actuated locking bolts.

Figure 5 is a front elevational view of the device, with the cover plate removed.

Figure 6 is a section taken on the line 6—6 of Figure 5 and shows the relative positions of the key to the locking bar.

Figure 7 is a view similar to Figure 5 and shows the plunger released and the locking bars withdrawn.

Figure 8 is a section on the line 8—8 of Figure 5 and shows the various members in operation.

Referring more in detail to the drawings the numeral 10 represents an automobile engine mounted on the usual type of chassis 11. Securely keyed to the crank shaft 12 at the rear end thereof is the load equalizer wheel 13. Said member 13 has a slightly raised surface on the periphery thereof to form gear 14.

Secured to the dash board 15 in a suitable manner is a rectangular casing 16 having bosses formed in the interior thereof and the latter being provided with holes adapted to threadably engage screws 17 shouldering in the cover plate 18 and to holding the latter in place on the casing 16.

A vertically disposed downwardly extending locking lever 19 passes thru slots in casing 16 wherein it is adapted to engage the locking mechanism which will be more fully hereinafter described. The lower end of said lever 19 has a semi-circular extension 20 having gear teeth 21 formed thereon. Secured to the dash-board and adapted to have the locking lever slide therein, a bearing bracket 22 is provided thereby giving rigidity of movement to the locking lever in its various operable positions. A stop 19' in the form of an extension of member 19 is provided to limit the upward movement of the latter. The upper end of the locking lever is cut away forming a seat for the plate 23 secured thereon by the screw 23'. An expansion spring 24 mounted between the wall of casing 16 and the seat plate 23 normally tends to urge the locking lever 19 downwardly into the locked position.

When the car is in use and the lock is idle the locking lever is in the position shown in Figure 5 and retained therein by the pawl 25 engaging the underside of stop 19'. When the automobile is parked or allowed to stand and the lock is to be used the pawl 25 is released from engagement with stop 19' by depressing the free end thereof. The spring which is compressed at this instant will force the locking lever 19 downwardly until the teeth 21 mesh with the corresponding teeth of the gear 14 thereby locking the engine crank shaft. A standard form shut-off valve 32 is located on the dashboard and is directly connected with the fuel supply line. The valve center stem has an arm 31 extending therefrom which has a pin 30 fixed to the end thereof. It is apparent from Figures 2 and 3 that when the locking lever 19 is moved downwardly to lock the gear 14, a pin 29 fixed to the said lever and engaging the slot 28 of the crank arm 26 will cause the latter to rotate thru an arc. As the said crank arm 26 is fulcrumed between ears 25, one end will be moved upward upon rotation thereof in a counter-clockwise direction while the opposite end thereof will move downward and, as the pin 30 is engaged in slot 28' and secured to arm 31 of the valve center stem, the latter is rotated thereby shutting off the fuel supply simultaneously with the locking of the gear 14.

In order to secure the lever 19 in the locked position the plunger bars 33 are provided and are adapted to be slidably secured in suitable recesses of the casing 16 and yieldably retained in contact slide surface of said recesses by the flat springs 37 which are secured to the cover plate 18. The extensions 34 of the plunger bars 33 are slid into recesses 35 located at the upper end of the bar 19 by means of the key 36 shown in broken lines in Figure 8, the blades of said key engaging the surface of the somewhat curved openings 33'. In Figure 6 the members 33 are shown in the locked position. In disengaging said members from the bar 19 the key is turned in the direction indicated by the arrow, the said blades will engage the flat surface of the opening 33' and the extensions 34 of members 33 will be withdrawn from the recesses of members 19 after which the locking lever can readily be slid upwardly.

A pivoting pin 37$^a$ is fixedly secured to the wall 38$^a$ of casing 16 and extends partly thru the lock, said pin being adapted to receive the inserted end of the key stem and to provide a swivel guide member therefor.

An auxiliary locking means is provided which can be operated independently or in combination with the above described lock and consists of an electromagnet 38 energized by a battery unit 39 and a switch 40 connected in series circuit therewith. A plunger 41, of magnetic metal and sliding in a hole in the core of the magnet and is adapted to normally engage a recess in the locking bar 19 by the urging of the expansion spring 42. It is obvious from the figure 2 that when the switch 40 is opened the spring will urge the plunger into the recess of locking lever 19 thereby securing the lever into the locked position. Likewise to release the latter the switch 40 is closed, the magnet 38 is energized, the spring is compressed by the plunger 41 and drawn in the direction indicated by the arrow and thereby withdrawing the plunger from the recess in the locking bar 19.

We claim:

1. In combination with the load equalizer of an automobile engine, a gear wheel formed integrally therewith, a lever having teeth to engage said gear wheel, recesses at the upper end thereof, a casing adapted to slidably receive said locking lever, plunger bars slidably secured in said casing and adapted to engage recesses of the said locking bars and secure the same in the locked position, a crank arm fulcrumed between extensions on the said casing having slots at the opposite ends thereof, pin members slidably engaging said slots, one of said pins adapted to arcuately rotate the said crank arm, the other of said pins adapted to arcuately rotate an arm integral with a valve center stem and an auxiliary locking means for securing the locking lever in the locked position.

2. In combination with the load wheel of an automobile engine, a gear wheel formed integrally therewith, a lever having teeth at the lower end thereof adapted to engage said gear wheel, a casing adapted to slidably receive said locking bars, plunger bars in the said casing, a key member adapted to actuate the said plunger bars, an electromagnet secured in said casing, a plunger adapted to slide in the core of the magnet, a spring normally urging the said plunger into engagement with a recess in the locking lever, and means for withdrawing the plunger from the said recess.

3. In combination with the load equalizer wheel of an automobile engine, a gear wheel formed integrally therewith, a lever having teeth at the lower end thereof adapted to engage said gear wheel, a casing adapted to receive the said locking lever, plunger bars adapted to engage recesses of the locking levers and secure the latter in the locked position, a key adapted to actuate the plunger bars, a crank arm fulcrumed between extensions of the casing, a pin fixed to the locking arm and engaging a slot in one end of the crank arm adapted to arcuately rotate the latter, a pin secured to an arm integral with a valve center stem, said pin adapted to engage a similar slot at the opposite end of the crank arm and arcuately rotate the said valve stem, and means for opening or closing the fuel supply valve.

4. In combination with the load equalizer of an automobile engine, a gear wheel formed integrally therewith, a lever having teeth at the lower end thereof adapted to engage said gear wheel, adapted to receive one end of said locking lever, plunger bars engaging recesses of said locking lever, a key member actuating said plunger bars, a releasing pawl adapted to engage the underside of a lug extension of the said locking lever and secure the latter in the unlocked position and means for releasing said pawl from engagement with the locking lever.

In witness whereof we affix our signatures.

ANTONIO TINO.
AUGUST H. ROTH.